O. H. FRANK.
FENDER FOR VEHICLES.
APPLICATION FILED SEPT. 26, 1910.

1,058,359.

Patented Apr. 8, 1913.

2 SHEETS—SHEET 1.

Witnesses:
Charles C. Abbe
S. Sahner

Inventor
Otto H. Frank
By his Attorney
W. T. Criswell

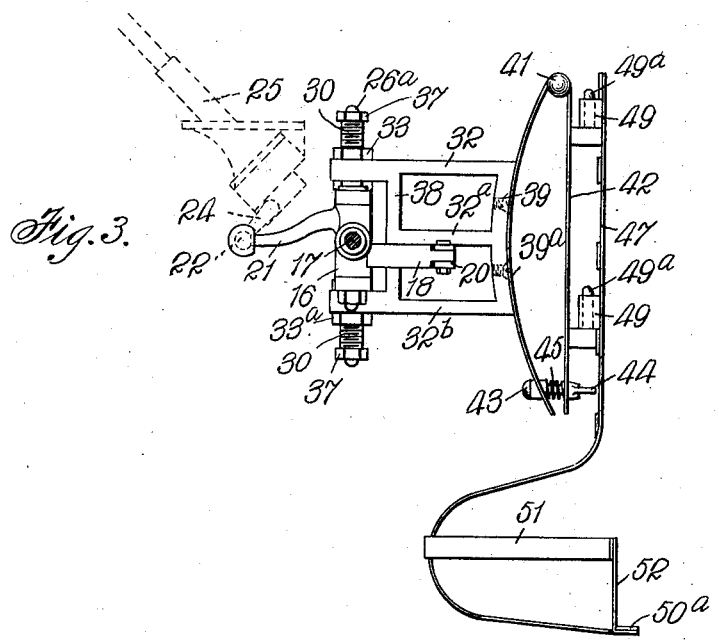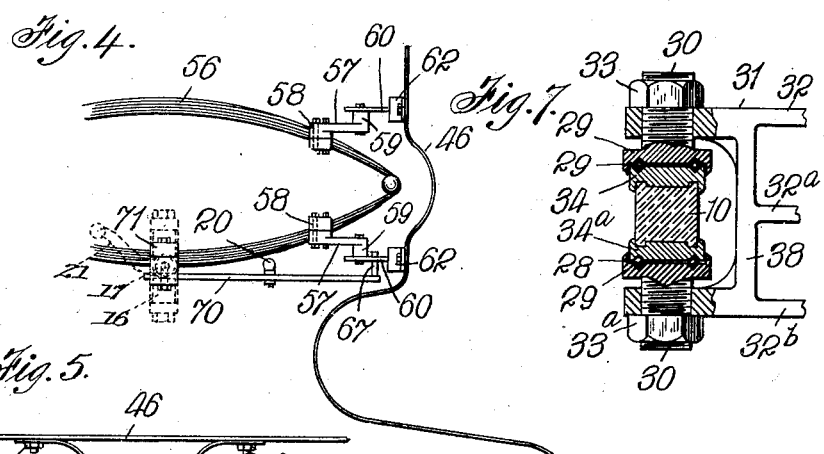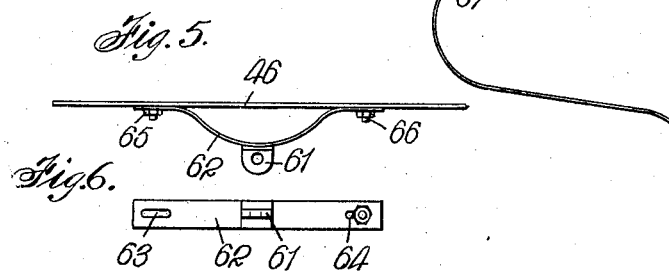

UNITED STATES PATENT OFFICE.

OTTO H. FRANK, OF NEW YORK, N. Y.

FENDER FOR VEHICLES.

1,058,359.     Specification of Letters Patent.     Patented Apr. 8, 1913.

Application filed September 26, 1910. Serial No. 583,888.

*To all whom it may concern:*

Be it known that I, OTTO H. FRANK, a citizen of the United States, and a resident of New York, borough of Brooklyn, county of Kings, and State of New York, have invented certain new and useful Improvements in Fenders for Vehicles, of which the following is a full, clear, and exact specification.

This invention relates to a class of fenders adapted to be applied more particularly to power driven vehicles and especially automobiles and the like.

The primary object of my invention is to provide a fender adapted to be operated by the steering gear which guides the front wheels of a vehicle so that the efficiency of the fender will be maintained at all positions of said wheels.

Another object of the invention is to provide efficient means for preventing objects or persons struck by the fender from being run over by the wheels of the vehicle and which will serve to safely pick such objects or persons up and carry them along until the vehicle is stopped, thus avoiding injuries or damage to life and property.

Another object of the invention is to provide a fender which is so constructed that it can easily and quickly be attached to or removed from any power driven vehicle.

Another object of the invention is to provide means for securing the fender to the forward springs of a vehicle, instead of to the front axle, in order to apply the fender to various forms of automobiles, or power driven vehicles.

With these various objects in view, my invention consists in the novel features of construction, combination and arrangement of parts, as represented in the accompanying drawing forming a part of this specification and hereinafter described and pointed out in the appended claims.

Figure 1:
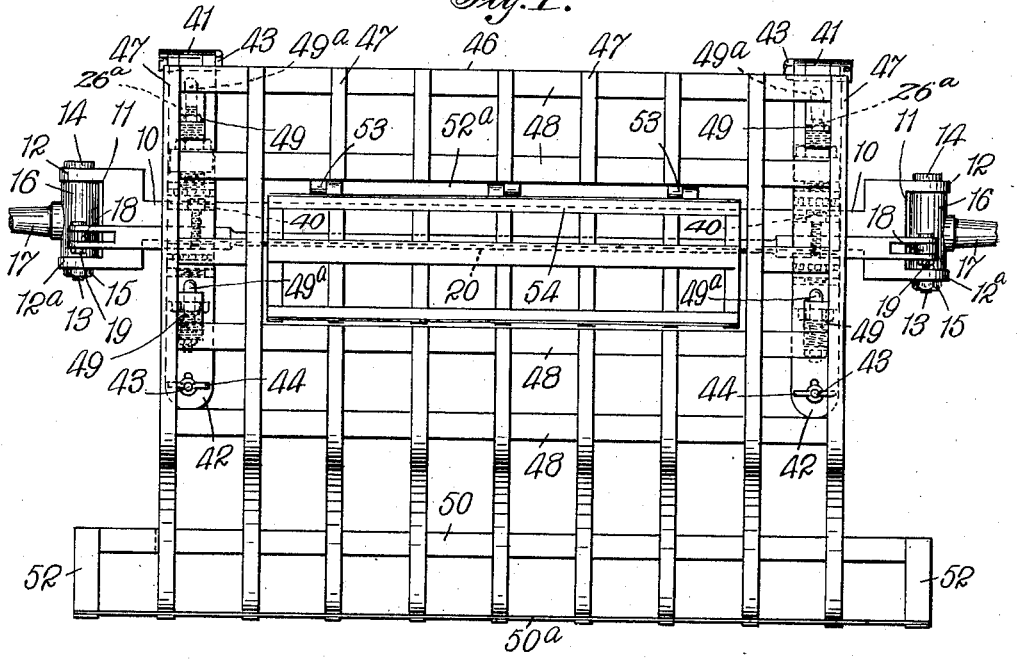
Figure 2:
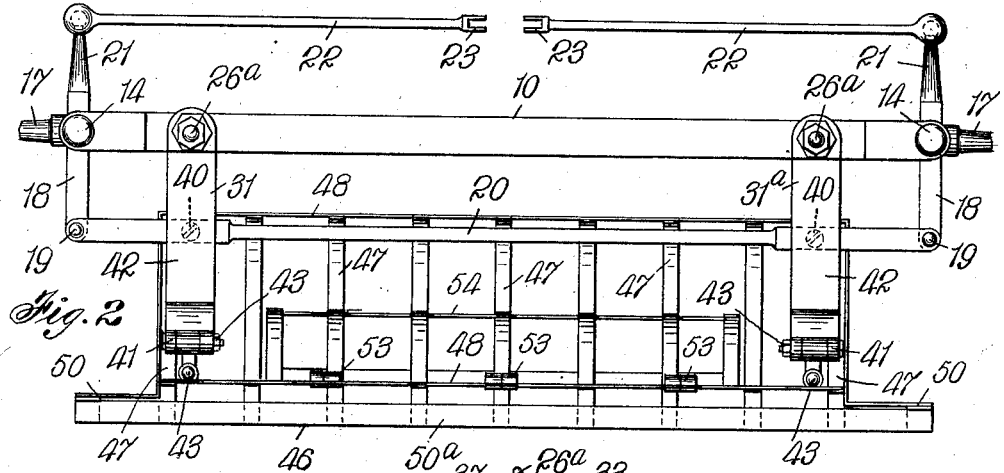
Figure 3:
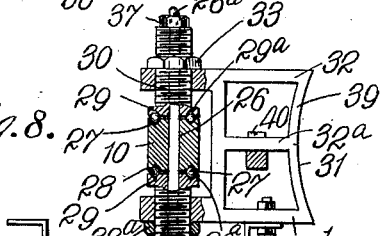

In the drawing, Figure 1 is a front view of my improved fender. Fig. 2 is a top plan view thereof. Fig. 3 is a side view showing the steering rod in dotted lines. Fig. 4 illustrates a modified form of connection of my improved fender to the spring of a vehicle. Fig. 5 shows a buffer used in connection with this modification. Fig. 6 is a buffer-plate used in connection with the buffer shown in Fig. 5. Fig. 7 is a sectional view of a bracket held to the axle for connecting the fender to the axles of a vehicle, and Fig. 8 is a similar sectional view of another form of means of connecting the fender to an axle.

The outer ends of the forward axle 10 of a power driven vehicle are forked, as shown at 11, Fig. 1, and the prongs 12, $12^a$ of said forks are provided with oppositely arranged openings for the passage of screw-bolts 13 having heads 14 resting with their underside upon the upper outer face of said prongs, while the screw threaded free ends of said bolts pass through the openings in the prongs and are secured in position by nuts 15. The screw-bolts 13 serve as a guiding means for sleeves 16 detachably held upon said bolts and carrying the customary studs 17 for securing the wheels of the vehicle to the axle 10. Adjacent to each lower end of said sleeve 16 is provided a link 18, which is pivotally held by bolts 19 between the pronged ends of a guiding rod 20, and to the outer ends of oppositely extending arms 21, 21 secured to the sleeves 16 are connected one end of rods 22 adapted to receive between the forked opposite ends 23, 23 the pin 24 of the steering rod 25 connected in the customary manner to the steering gear of a vehicle, not shown.

Through the axle 10 in proximity to the forked ends 11 is formed a vertical opening 26 for passage therethrough of bolts $26^a$, and the upper and lower peripheral edges of said openings are concaved so as to form bearings 27 for balls 28, said bearings being closed by caps 29 in which annular grooves $29^a$ are provided so as to form a raceway for said balls around the screw-threaded shaft 30 of the caps 29, for the purpose of guiding said caps with the least possible friction upon the axle so that the fender, as will hereinafter be more fully described, may readily follow the precise guiding movement of the front wheels when the vehicle is steered. To the threaded shafts 30 are held two brackets or frames 31 and $31^a$ each consisting of three bars, as 32, $32^a$ and $32^b$ and the outer ends of the bars 32 and $32^b$ have threaded openings for the passage of the threaded shafts 30 whereby the frames 31 and $31^a$ may be held in an adjusted position upon said threaded shafts by nuts, as 33 and $33^a$.

The bolts 26 may be dispensed with and instead thereof the axle 10 may be provided with suitable caps, as 34 and 34ª, Fig. 7, upon the upper surface of which are formed grooves providing bearings for balls 28 movable in the like annular grooves of the cap 29 formed upon the threaded shaft 30.

In front of the axle 10, the bars 32 and 32[b] of the brackets or frame 31 are connected by vertical bars 38 and the outer ends of said bars 32 and 32[b] are connected by bars 39 which may be slightly concave, as shown in Figs. 3 and 8. The centrally arranged bars 32[a] between the bars 32 and 32[b] connect the middle of the concave bars 39 with the middle of the vertical bars 38 in front of the axle, and serve to greatly increase the strength and stability of the frame 31, and screw-bolts 40 firmly connect the middle bars 32[a] of the frame with the guiding rod 20, thus insuring the positive movement of the frame in unison with said guiding rod and also with the movements of the steering rod connected to said rod 20 as above described. Vertical spring plates or bars 39[a] are conveniently fastened by any well known means to the concave bars 39, said plates or bars 39[a] protruding for a distance above and below the ends of said bars 39. To the upper ends of said plates or bars 39[a] are hinged as shown at 41 the upper ends of spring or carrier bars 42, the lower ends of which are perforated so as to allow passage of the screw-threaded ends of bolts 43 which extend from the rear through the bars 39[a] and the perforations of the bars 42. Thumb screws 44 upon the outer projecting ends of said bolts 43, allow an adjustment of the lower ends of the bars 42 with relation to bars 39[a], the resiliency of such connection being furthermore greatly augmented by the introduction of spiral springs 45 encircling the bolts 43 between the inner faces of the bars 39 and 42, and tending to press both apart.

It is clear that by loosening the thumb screw 44 the bars 42 and the fender proper attached thereto as will hereinafter be more fully described, may be swung upwardly so as to give easy and convenient access to the front of the vehicle if necessity arises.

The fender proper 46, consists of any convenient number of cross-connected bars 47 and 48 so as to form a lattice work as illustrated. Upon the rear surface of the outer vertical end bars 47 are arranged hinges 49 by means of which the fender may be removably fastened to the pins 49[a] arranged in corresponding numbers upon the outer faces of the bars 42. The lower portions of the vertical bars 47 of said fender frame are U-shaped, and arranged so as to extend under the front of the body of a vehicle. The free lower ends of the vertical bars 47 are connected by horizontal cross-bars 50 and 50[a] and bars 51 connect the U-shaped portions of the vertical bars 47 with the horizontal bar 50. The outer free ends of said bars 51 are bent outwardly and have the outer ends thereof connected by vertical links 52 which are also connected to the outer ends of the horizontal bar 50[a], thus forming a convenient and effective catching device for picking up a person or obstacle in the path of the vehicle and preventing contact with the wheels of said vehicle.

In the central part the lattice work forming the body of the fender is provided an opening 52[a], and to one of the horizontal bars 48 of the fender is hinged, as at 53, an outwardly swinging gate 54 to allow convenient access to the crank of the vehicle.

To one end of the rod 26[a] may be secured a bracket 55, as shown in Fig. 8. One end of the bracket 55 is connected to the bar 32[b] of the bracket 31, and its other end may be fastened to one of the rods 22 so that the parts will be strengthened thereby for the steering rod of the vehicle to operate the fender, though it will be understood that the bracket 55 may be dispensed with if desired.

In Fig. 4 a modified form of connection is shown for fastening my improved fender to the front springs 56 of an automobile or vehicle having springs projecting for a distance in front of the forward axle thereof. In this form, the fender is secured upon the upper and lower part of the spring 56 of vehicle by means of brackets 57 having clamps 58 which are adapted to be held by bolts or otherwise to the spring 56. Upon the opposite end of said brackets 57 are provided studs 59 upon each of which is pivotally held links 60 to which is connected the lugs, as at 61, of a buffer-plate 62, each having a slot at each end, as 63 and 64, through which are passed bolts 65 and 66 which engage the end vertical bars 47 of the fender. There are two of the buffer-plates 62, and by this arrangement it is evident that the fender will be yieldingly held to the brackets 57. In an opening in the lower link 60 is pivotally held the pin 67 provided upon an arm 70 upon the opposite end of which is arranged a suitable clamp 71 for holding said arm to the spring 56, and centrally of the arm 70 is held the rod 20 by which the fender is guided synchronically with the steering of the wheels of the vehicles.

It is understood that changes may be made in the form or in the proportions of the parts forming my improved fender, or that the arrangement of the parts may be changed when occasion requires, without departing from the scope and purpose of my invention; therefore I do not wish to be limited to the particular form herein described and shown.

Having thus described my invention, I claim as new and desire to secure by Letters Patent:

1. A fender for power driven vehicles, comprising a resilient fender proper composed of cross-wise arranged bars, having a U-shaped lower end opening toward the front of the fender, spring bars having front hooks adapted to removably engage hinges provided upon the rear of the fender proper, and a frame to the front of which the back part of said spring bars are connected, means to pivotally connect said frame to the front axle of a vehicle, and means to swing said frame and fender in unison with the front wheels, said latter means being actuated by the steering rod of the vehicle.

2. A fender for power driven vehicles, comprising a resilient fender proper, vertically disposed springs, each composed of a front bar and a rear bar having their upper ends pivotally connected, the front bars being adapted to removably carry the fender proper, brackets consisting of each three horizontal parallel bars to which the rear bars of the springs are attached, vertical bolts pivotally and anti-frictionally secured in vertical passages of the axle adapted to carry the outer ends of the uppermost and lowermost bracket bars and means to swing said brackets in unison with the front wheels, said latter means being actuated by the steering rod of the vehicle.

3. A fender for power driven vehicles, comprising a resilient fender proper, two vertically disposed springs, each composed of a front bar and a rear bar having upper ends pivotally and lower ends separately connected, the front bars of the springs carrying the fender proper, brackets consisting each of three horizontal parallel bars and two vertical bars, one of the corresponding vertical bars of each bracket being concave, the rear bars of the vertical springs being attached to said concave bar, bolts pivotally secured in vertical passages of the axle, ball-bearings for guiding said bolts without friction in said passages, and a rod pivotally connected to the ends of said axle and firmly connected to the central horizontal bars of said brackets for the purpose of swinging said brackets and the fender attached thereto in unison with the guiding of the front wheels by the steering rod of the vehicle.

This specification signed and witnessed this 29th day of June A. D. 1910.

OTTO H. FRANK.

Witnesses:
ROBT. B. ABBOTT,
S. SAHNER.

---

Copies of this patent may be obtained for five cents each, by addressing the "Commissioner of Patents, Washington, D. C."